United States Patent Office 3,458,626
Patented July 29, 1969

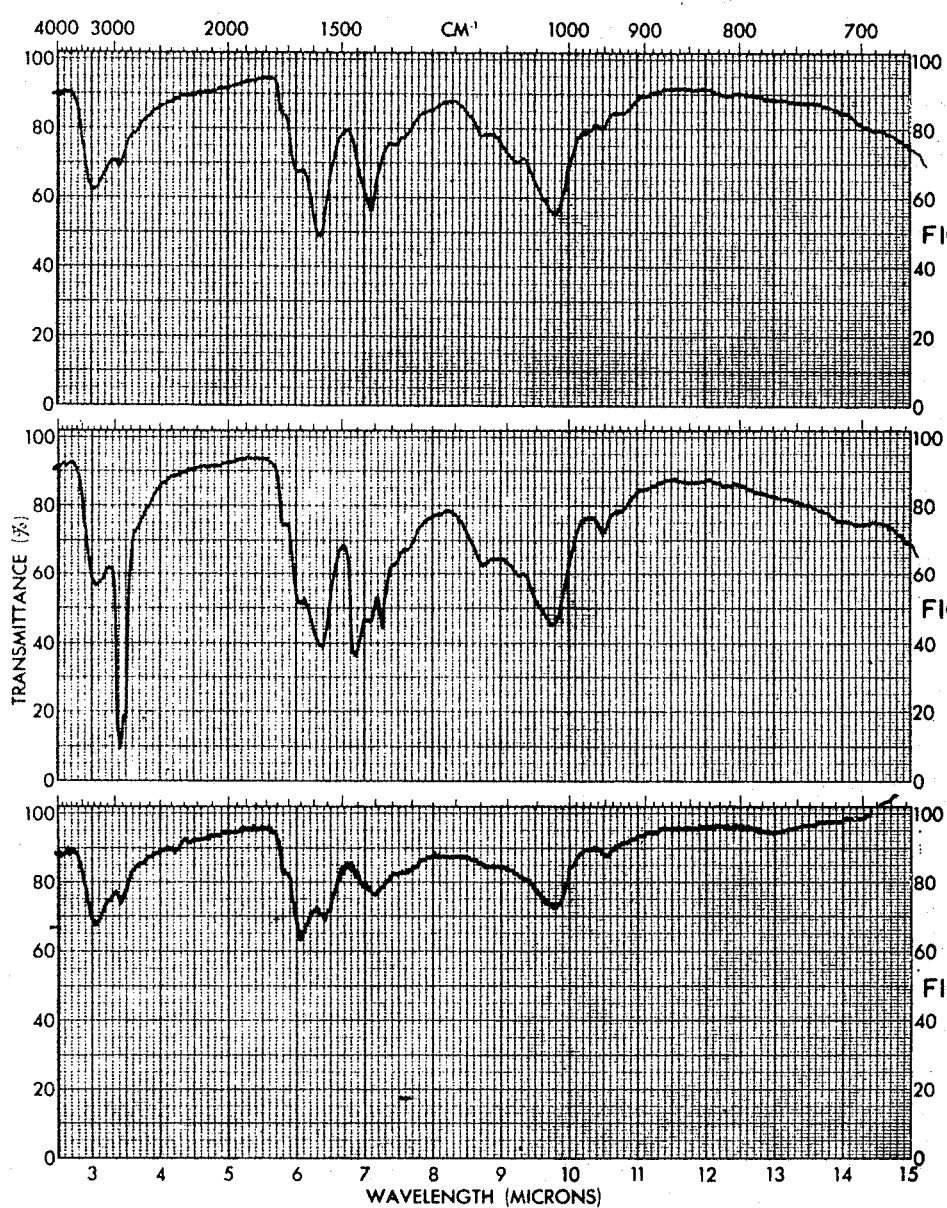

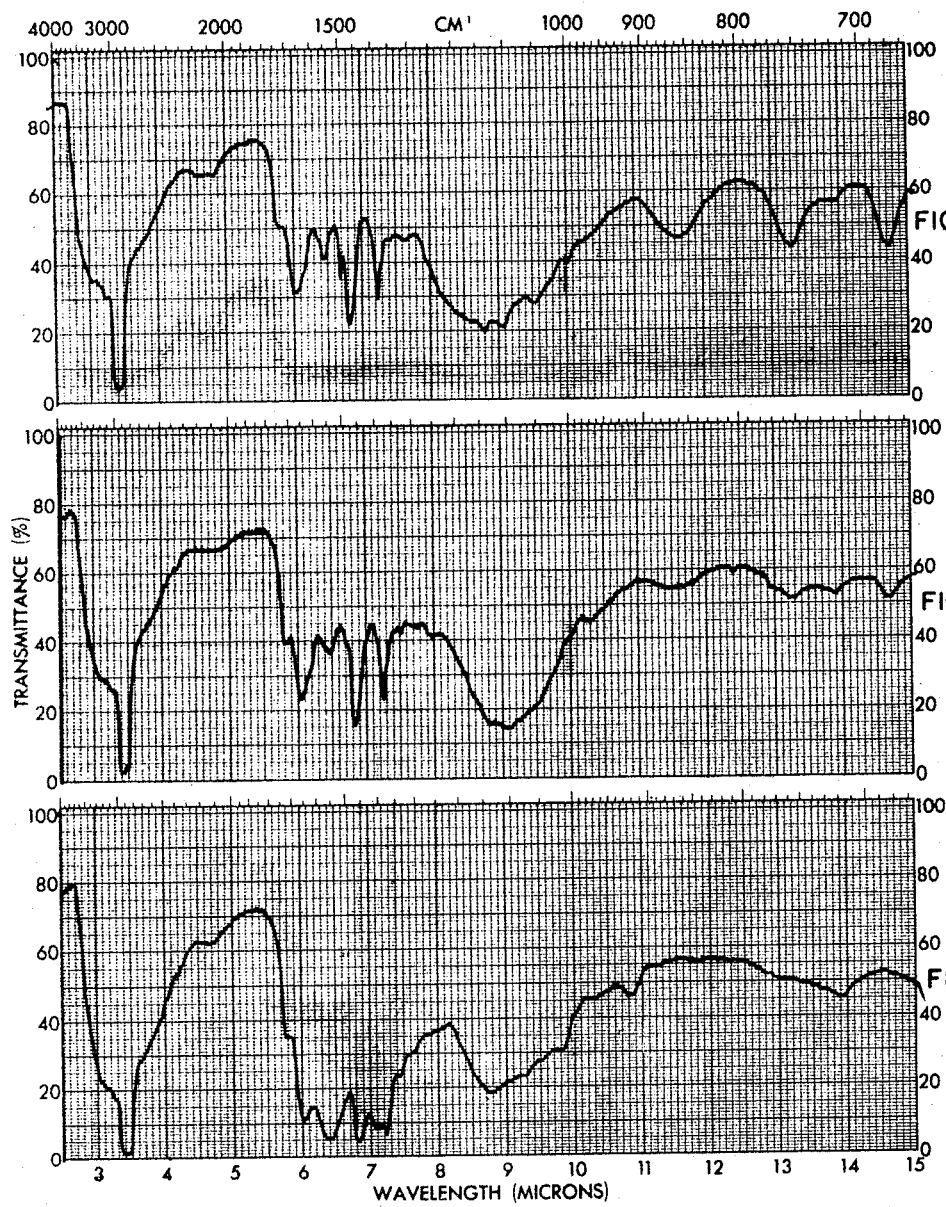

3,458,626
ANTIBIOTICS 15 AND METHODS FOR THEIR PRODUCTION
Marvin J. Weinstein, East Brunswick, George M. Luedemann, Glen Ridge, and Gerald H. Wagman, East Brunswick, N.J., assignors to Schering Corporation, Bloomfield, N.J., a corporation of New Jersey
Continuation-in-part of application Ser. No. 574,107, Aug. 22, 1966. This application Feb. 26, 1968, Ser. No. 711,153
Int. Cl. A61k *21/00;* C07q *11/00*
U.S. Cl. 424—116                      9 Claims

ABSTRACT OF THE DISCLOSURE

This invention relates to new compositions of matter exhibiting antibiotic activity produced by a hitherto undescribed species of Streptomyces, said compositions being herein designated as the Antibiotic 15 complex.

---

This invention also relates to methods for the production, isolation and separation of the Antiobiotic 15 complex.

This applications is a continuation-in-part of our copending application Ser. No. 574,107, filed Aug. 22, 1966, now abandoned.

This invention relates to new and useful antibiotics and to methods for their manufacture.

More specifically, this invention relates to a new antibiotic complex, to its salts and to methods for its production, isolation and purification. In a more specific aspect, this invention relates to new and useful antibiotics formed by the cultivation under controlled conditions of a hitherto undescribed species of the genus Streptomyces of the order Actinomycetales.

THE MICROORGANISM

The microorganism used in the instant invention is a species of Streptomyces. A culture of living organisms of this species has been deposited and made part of the stock culture collection of the United States Department of Agriculture, Northern Utilization Research and Development Division, Peoria, Ill. from which it is readily available to the public upon request under the identification of Streptomyces sp. NRRL 3223, hereinafter identified as Streptomyces 3223. Streptomyces 3223 was originally isolated from soil found along the banks of the St. Johns River near DeLand, Flo. Streptomyces sp. 3223 is characterized by having two types of mycelia. One type has a diameter of approximately of $0.5\mu$ and under microscopic examination is non-refractile while the other type has a diameter of up to $1.5\mu$ and under microscopic examination is highly refractile. The latter type of mycelium is further characterized as having protuberances suggestive of Chlamydospores, however, no true spores have been observed. Both types of mycelia appear as short straight to irregular brittle pieces which are easily fractured in the preparation of a slide smear. The organism is aerobic and grows well at temperatures between about 25° and about 37° C.

On macroscopic examination Streptomyces 3223 grown on a medium consisting of 3 percent NZ Amine Type A (Sheffied Chemical Company, Norwich, N.Y.), 1 percent dextrose, 1.5 percent agar appear to be raised and brownish to black in color. These colonies are further characterized by producing an abundance of brownish-black diffusible pigments and by failing to produce powdery aerial mycelium.

Colonies of Streptomyces 3223 may be further characterized by their appearance and growth on various media. Table I which follows gives the growth and color characteristics of Streptomyces 3223 on some of the more widely used nutrient materials. The colonoy observations were made on 21-day old colonies. In describing the color formations, the following system and references are employed: The color designation consists of two designates. The first name is a color name taken from the "Descriptive Color Name Dictionary" by Taylor, Knoche and Granville, published by the Container Corporation of America 1950 (USA) with a color chip number corresponding to the color name; said chip number taken from the "Color Harmony Manual" 4th edition, 1958, published by the Container Corporation of America, USA. The second designate consists of a color name and number which refer to the synonym or near synonym found in the National Bureau of Standards Circular 553, Nov. 1, 1955 (USA).

TABLE 1.—COLONY CHARACTERISTICS OF STREPTOMYCES 3223 ON VARIOUS MEDIA

| Media | Observations |
|---|---|
| Glucose Asparagin Agar | Growth: fair, colony raised and granular. Color: bamboo-g2fb; moderate yellow-87. |
| Gelatin | Weak liquefaction. |
| Milk | Not digested. |
| Sucrose | Not utilized. |
| Starch | Hydrolyzed. |
| Bennett's Agar | Growth: good, plicate, scaly, dark faintly diffusible pigment. Color: Beaver-g3LI; Moderate olive brown-95. |
| Emerson's Agar | Growth: good plicate, scaly, dark diffusible pigment. Color: Golden brown-g3PG; strong yellowish brown-74. |
| Tomato Paste Oatmeal Agar. | Growth: good, furrowed, scaling, faint dark diffusible pigment. Color: Clove brown-g3NI, dark yellowish brown-78. |
| Glucose Yeast ext_act Agar. | Growth: good, plicate, abundant dark brown diffusible pigment. Color: Clove brown-g3PL, light olive brown, 94. |
| Potato Slice | Good Growth (with or without $CaCO^3$). |
| Sucrose Nitrate Agar (Czapek's Agar). | Growth poor. |
| Peptone Iron Agar Observations at 2, 7 and 14 days. | Black diffusible pigment abundant. |
| Tyrosine Agar Observations at 2, 7 and 14 days.[1] | Black diffusible pigment, growth not dissolving crystals. |

[1] After Gordon and Smith J. Bact. 69-147.

Streptocyces 3223

Streptomyces 3223 shows good growth on glucose, inositol and glycerol. The species exhibits generally fair growth on galactose, levulose, mannose, starch and mannitol. Poor growth for the species was observed on carbohydrate sources such as arabinose, lactose, raffinose, rhammose, sucrose, xylose, sorbitol, molibiose and ribose.

Table II acts forth the growth characteristics of Streptomyces 3223 on representative nitrogen containing media, each of which contains 1 percent by weight of glucose as the carbohydrate source.

TABLE II.—UTILIZATION OF NITROGEN SOURCES

| Medium | Characteristics |
|---|---|
| 0.5% Difco Yeast Extract | Growth: good, plicate-scaling, faint dark diffusible pigment. Color: Clove brown-g3PL; light olive brown-94. |
| 1.0% NZ Amine Type A | Growth: good, plicate, dark brown diffusible pigment. Color: Clove brown-g3PL; light olive brown-94. |
| 1% Asparagine | Growth: poor, poorly defined. |
| 1% Glutamic Acid | Do. |
| 1% Sodium Nitrate | Do. |
| 1% Ammonium Nitrate | Do. |

Although the invention herein disclosed relates to the use of Streptomyces 3223 in the production of antibiotic substances, it is to be understood that this invention is not so limited but includes the use of variants thereof and mutants produced from the described organism by mutating agents such as high frequency radiation (X-ray, ultra-violet) actinophages and nitrogen mustards.

The antibiotic

Streptomyces 3223 by the controlled fermentation described herein produces a plurality of antibiotic substances hereinafter referred to as Antibiotic 15 complex; the individual components of which are sometimes called by their particular letter designation such as Antibiotic 15A, Antibiotic 15B and so forth.

In order to produce Antibiotic 15 complex, Streptomyces 3223 is grown at temperatures between 25 and 40° C. under submerged aerobic conditions in an aqueous nutrient medium containing carbon and nitrogen in forms utilizable by said organism. (Exemplary of such a medium are those described as media number 1 and 2 below.)

In general the fermentation is carried out for about four to seven days at approximately 28° C. in media No. 1 and 2 described below. Medium No. 1 contains beef extract 0.3%, tryptose 0.5%, dextrose 0.1%, soluble starch 2.4%, yeast extract 0.5% and tap water to 100%. In the foregoing the percentages represent weight to volume. Medium No. 2 contains yeast extract 100 g., potato dextrin (No. 650)–1000 g., dextrose 100 gms., calcium carbonate 140 g., and tap water to 20.0 liters.

In addition to the nutrient media described above, suitable defoaming agents are added periodically to the fermenting mixture. Exemplary of such a defoaming agent is Dow Corning Antifoam, which is obtainable from Dow Corning, Midland, Mich.

The fermentation is conducted at a pH of approximately 6.8 to 7.3. The antibiotic complex is extracted by the acidification of the whole broth with strong acid, such as sulfuric acid, to a pH of about 2.0. The broth is filtered and the filtrate neutralized with alkali to a pH of about 6.0. The neutralized broth is contacted with a cationic exchange resin, preferably one of the "Amberlite" IRC–50 type. Examples of such cationic exchange of resins (as well as anionic exchange resins disclosed hereinafter) may be found in the "Handbook of Chemistry and Physics, 42nd edition, Chemical Rubber Publishing Co., Cleveland, Ohio. The antibiotic complex is eluted from the ion exchange resin with dilute sulfuric acid. The acidic eluate is neutralized by contact with an anion exchange resin, preferably one of the amberlite IRA 401S type. The antibiotic solution is lyophilized and the resulting crude antibiotic complex isolated and assayed by the standard agar diffusion technique described as follows using *Staphylococcus aureus* ATCC 6538P as test organism.

A reference curve is prepared by plotting the dosage-response of the antibiotic diluted in phosphate buffer at pH 8 in an aqueous medium consisting of:

| | Percent w./v. |
|---|---|
| Peptone | 0.60 |
| Pancreatic digest of casein | 0.40 |
| Yeast extract | 0.30 |
| Beef extract | 0.15 |
| Dextrose | 0.15 |
| Agar | 1.50 |

The pH of the medium is adjusted to 8.0 with sodium hydroxide solution. A suspension of the assay organism (*S. aureus*) is standardized to provide 20 percent transmission at 600 m$\mu$ in a colorimeter. The potency of the sample is determined from the reference curve and expressed in terms of units per milligram (a unit being that amount of test substance required to produce an 18 mm. zone of inhibition with a 12.7 mm. disc).

Antibiotic 15 complex may be separated into its individual components by numerous separation techniques. Applicants prefer chromatography of the complex on a silicic acid column using an eluent comprising ethanol-pyridine-acetic acid-water and ethyl acetate in a ratio of 5:1:2:2:2 (v.:v.). It is, however, often desirable to desalinate the crude antibiotic complex prior to chromatography. This desalination usually facilitates a better separation on chromatography and is effected by adsorbing the complex on a "sephadex G–10" column (Pharmacia Incorporated, New Market, N.J.) and washing with deionized water thereby permitting the antibiotic to pass through while delaying passage of the salts because of their smaller molecular size.

A typical silicic acid column will yield the following fractions having chemical and biological properties as described hereinafter. The $R_f$ values shown in Table III were obtained by descending paper chromatography on a solvent system comprising propanol:pyridine:acetic acid:water (15:10:3:12 v./v.). The papers were run at 25° C. for 48 hours and bioautographed against *Klebsiella pneumonia*.

TABLE III

| Antibiotic 15 Fraction | Column Cuts Number | Volume (ml.) | Percent of total Active Weight | R |
|---|---|---|---|---|
| A | 83–114 | 62 | 17.8 | 0.53 |
| B | 166–248 | 82 | 12.7 | 0.41 |
| C | 307–416 | 225 | 11.8 | 0.30 |
| D | 683–766 | 166 | 9.9 | 0.24 |
| E | 912–982 | 140 | 34.9 | 0.17 |
| F | 1,041–1,137 | 192 | 12.9 | 0.13 |

Chemical characteristics of Antibiotic 15 components (1) *Stability.*—All of the components of the Antibiotic 15 complex are stable in buffer from pH 2.2 to 10.0 for at least 30 minutes in a boiling water bath.

They are in like manner, stable in the presence of trypsin (pH 8), chymotrypsin (pH 8), pepsin (pH 2), and $\alpha$-amylase (pH 4) at 37° C. for at least 3 hours. The pH values of the foregoing denote the pH at which the enzyme is most active.

(2) *Analysis.*—The following tables summarize the chemical and physical properties of the individual components of the Antibiotic 15 complex.

TABLE IV

| Chemical Tests | A | B | C | D | E | F |
|---|---|---|---|---|---|---|
| Ninhydrin | + | + | + | + | + | + |
| Starch-Potassium Iodide | + | + | + | + | + | + |
| Sakaguchi | − | − | − | − | − | − |

NOTE.—In the foregoing table (+) denotes a positive test and (−) denotes a negative one.

TABLE V

| Elemental Analyses, percent | A | B | C | D | E | F |
|---|---|---|---|---|---|---|
| Carbon | 41.65 | 38.35 | 39.18 | 36.31 | 38.34 | 44.45 |
| Hydrogen | 7.23 | 6.45 | 6.81 | 6.42 | 6.86 | 7.61 |
| Nitrogen | 8.38 | 8.10 | 10.74 | 10.90 | 12.31 | 12.89 |
| Oxygen | 42.74 | 47.10 | 43.27 | 46.37 | 42.49 | 35.05 |

TABLE VI

| Rotation | A | B | C | D | E | F |
|---|---|---|---|---|---|---|
| $\alpha_D{}^{25}$, degrees | +56.0 | −1.3 | +.1 | +.4 | | |
| Conc | 0.2 | 0.3 | 0.4 | 0.4 | | |
| Solvent | (¹) | (¹) | (¹) | (¹) | | |

¹ H₂O.

Fractions A through F respectively are transparent to the ultraviolet between 220 and 400 m$\mu$. These fractions additionally exhibit no discrete melting point up to 300° C.

Infra-red spectra

The infra-red spectra of components A through F are presented herein as FIGURES 1 through 6 respectively, as specified in Tables VIIA and VIIB wherein the respective major peaks are tabulated. The spectra were determined on the components in a mineral oil (Nujol) mull or as thin films. (A film results from the evaporation of a solvent from a solution of the component under test.)

The characteristic absorption peaks as read from the respective figures are recorded as s.=strong, m.=medium, w=weak, b.=broad, sh.=shoulder (and v=very). Symbols recorded as combination retain their normal meanings e.g. m.w.=medium to weak and v.s.=very strong.

TABLE VIIA

| Component A (Film) | | Component B (Nujol) | | Component C (Film) | |
| --- | --- | --- | --- | --- | --- |
| Peak location (μ) | Peak Strength | Peak location (μ) | Peak Strength | Peak location (μ) | Peak Strength |
| 3.05 | M-S | 3.06 | M | 3.06 | M-S |
| 5.80 | sh | 5.80 | W | 6.02 | M |
| 6.01 | M | 6.05 | M | 6.33 | S |
| 6.35 | S | 6.35 | S | 7.07 | M-S |
| 7.10 | M-S | 7.05 | M | 8.75 | W |
| 7.48 | W | 7.45 | V-W | 9.24 | W |
| 8.72 | W | 7.61 | W | 9.77 | S |
| 9.24 | W | 8.72 | W | 10.50 | W |
| 9.78 | S | 9.25 | W | | |
| 10.49 | W | 9.75 | S | | |
| | | 10.47 | M-W | | |

TABLE VIIB

| Component D | | Component E (Nujol) | | Component F (Nujol) | |
| --- | --- | --- | --- | --- | --- |
| Peak location (μ) | Peak Strength | Peak location (μ) | Strength | Peak location (μ) | Peak Strength |
| 3.0-3.3 | b-sh | 3.0, 3.3 | b-sh | 3.0-3.3 | b-sh |
| 4.6-4.9 | B-W | 4.80 | VW-b | 4.70 | VW |
| 5.81 | sh | 5.83 | W-M | 5.80 | W-M |
| 6.03 | S | 6.03 | S | 6.03 | S |
| 6.46 | M | 6.47 | M | 6.42 | S-b |
| 6.70 | M | 8.80 | S-b | 7.10 | W |
| 7.65 | VW | 9.07 | S-b | 7.45 | W |
| 8.80 | W | 10.30 | W | 8.77 | M-b |
| 9.07 | W | 11.50 | VW-b | 9.30 | sh |
| 9.52 | W | 13.25 | W-b | 9.82 | W |

Underline broad absorption from—

| 8.0μ | | 9.8μ | | | |
| --- | --- | --- | --- | --- | --- |
| 11.62 | W-b | 14.68 | W | 10.85 | W |
| 13.27 | M-b | | | 15.34 | W-M,b |
| 4.70 | M-b | | | | |

Biological characteristics of Antibiotic 15 components (1) In vitro spectrum.—The in vitro spectrum of the Antibiotic No. 15 complex and components was determined by the two fold tube dilution assay in a medium comprising nutrient broth 0.8 percent, yeast extract 0.3 percent and glucose 0.1 percent. The minimal inhibitory concentration (mic) in mcg./ml. for the complex and the various components is reported in the following table.

TABLE VIII

| Organisms | Component | | | | | | |
| --- | --- | --- | --- | --- | --- | --- | --- |
| | A | B | C | D | E | F | Complex |
| Bacillus subtilis ATCC 6633 | 7.5 | 0.6 | 1.0 | 0.05 | 0.05 | 0.25 | 0.03 |
| Staphylococcus aureus ATCC 6538P | 7.5 | 2.5 | 2.5 | 0.075 | 0.075 | 0.75 | 3.0 |
| Streptococcus pyogenes DA 21[1] | 40.0 | 20.0 | 20.0 | 20.0 | 15.0 | 10.0 | |
| Escherichia coli ATCC 10536 | 40.0 | 20.0 | 20.0 | 2.5 | 7.5 | | 15.0 |
| Klebsiella pneumoniae DA-20[1] | 2.5 | 2.5 | 2.5 | 0.25 | 0.1 | 5.0 | 0.3 |
| Proteus vulgaris DA 121[1] | 7.5 | 2.5 | 2.5 | 0.75 | 2.5 | 5.0 | 3.8 |
| Pseudomonas aeruginosa HCC 8689 | 7.5 | 2.5 | 2.5 | 2.5 | 2.5 | 0.75 | 1.8 |
| Salmonella schottmuelleri DA-10[1] | 2.5 | 2.5 | 2.5 | 0.25 | 0.25 | 0.75 | 1.5 |
| Staphylococcus aureus DA-2040[1] | 7.5 | 2.5 | 2.5 | 0.10 | 0.1 | 5.0 | |
| Diplococcus pneumoniae | 15.0 | 2.5 | 7.5 | 0.25 | 2.5 | 5.0 | |

[1] DA refers to Schering Corporation Collection Number.

In vivo activity

The Antibiotic 15 Complex, comprising Components A through F respectively, with a potency of 4000 dilution units per mg. against S. aureus ATCC 6538P was tested against a variety of infections in mice. The mice used were the Carworth Farms CF No. 1 strain weighing about 20 grams (1/50 kg.).

The infectious organisms were administered by intraperitoneal injection ½ hour after the administration of the antibiotic via subcutaneous injection.

The $PD_{50}$ of the Antibiotic 15 complex against S. aureus (Gray) is 0.01 mg./mouse and the $PD_{100}$ against the same infectious organism is 0.05 mg./mouse. Against Klebsiella pneumoniae the Antibiotic 15 complex has a $PD_{50}$ of 0.1 mg./mouse with full protection at 0.2 mg./mouse.

The acute $LD_{50}$ of the Antibiotic 15 complex is greater than 10 mg./mouse (>500 mg./kg.) via the intraperitoneal route and greater than 0.8 mg./mouse (>40 mg./kg.) by subcutaneous administration.

It is apparent from the foregoing that the components of the Antibiotic 15 complex are potent antibacterial substances exhibiting a broad spectrum of activity. These antibiotics are thus individually useful in the sterilization of laboratory glassware and the sterilization of operating rooms and surgical instruments.

In combination (as the Antibiotic 15 complex) the antibiotics of this invention may be used to combat infections in laboratory animals, especially those caused by S. aureus (Gray) and Klebsiella pneumoniae. Further, the Antibiotic 15 complex may efficaciously be used in the cleaning and sterilization of bottles used in the food and beverage industry, especially in view of the temperature and pH stability it exhibits. When so utilized, the Antibiotic 15 complex may be augmented by the incorporation of soaps and/or detergents.

Additionally, the antibiotics of the instant invention may be used as a diagnostic aid to inhibit one organism while permitting the over-growth of another. This differential culturing is an especially valuable tool in the case of coincident infections by a plurality of organisms wherein the identity of at least one of the organisms is known. The known organism in the test culture can be inhibited by the incorporation of a MIC of antibiotic in the test medium prior to incubation thereby permitting the growth of the unknown organisms. The repetition of this procedure over a large number of tests using a variety of media will usually result in the production of enough pure colonies for determinative purposes.

Although the antibiotics disclosed herein have been described above both generally and specifically as the free nitrogen bases, many modifications in the antibiotics will suggest themselves to those skilled in the art from a study of the foregoing description. It will be obvious, for example, that these basic antibiotics will form acid addition salts with both organic and inorganic acids. Exemplary of such salts are those formed with hydrochloric, sulfuric, phosphoric, toluenesulfonic, methanesulfonic and succinic acids. These salts are water soluble solids and possess the antibiotic properties of the bases, differing only in degree. They may be prepared by the acidification of an aqueous solution of the free base with the requisite acid followed by lyophilization of the resulting solution. Applicants consider such salts to be the full equivalent of the free bases disclosed above and to fall within the scope of this invention.

The procedures as set forth herein are to illustrate the best mode contemplated by the applicants for carrying out their invention and are not to be construed as limiting the scope thereof.

Example 1

A. Inoculate 100 ml. of medium No. 1 contained in a 300 ml. Erlenmeyer flask, with a lyophilized culture of Streptomyces 3223 under aseptic conditions. Grow this inoculum for 72 hours at 28° C. with rotary agitation at 250–275 r.p.m.

B. Inoculate a series of 2 liter flasks, each containing 500 ml. of sterile medium No. 1 with 25 ml. of the inoculum prepared in step A. Incubate the flask for 3 days at 28° C. on rotary shakers at 250–275 r.p.m. Pool the contents of the series of flasks.

C. Aseptically introduce 500 ml. of the pooled inoculum from step B into a series of 14 liter fermenters containing 10 liters of sterile medium No. 2. Ferment the mixture at 28° to 30° C. with agitation at 250 r.p.m. while introducing air at 7 p.s.i. and 0.35 cu. ft./min. Continue the fermentation for 48 to 72 hours while maintaining the foaming at a minimal level by using a suitable anti-foam agent. Pool the fermentations into 15 liter batches and process each one, separately, through the remaining steps.

D. Acidify the fermentation mixture to pH 2 with 12 N sulfuric acid and good agitation. Agitate at pH 2 for fifteen minutes and filter using a suitable filter aid. Neutralize the filtrate with 10 N sodium hydroxide and discard the filter cake. Readjust the neutral filtrate to pH 4 by the addition of a 15 percent aqueous solution of oxalic acid to precipitate the calcium as a calcium oxalate. Filter the insoluble salt using filter aid, discard the filter cake and adjust the filtrate to pH 7.0.

E. Fill a glass column (36" x 1") with 400 ml. of IRC–50 resin in the sodium cycle. Pass the neutral broth filtrate through the resin column at approximately 40 ml. per minute until all of the broth has been so processed. Wash the resin column with distilled water until the washes are colorless.

F. Elute the antibiotic complex from the resin with 0.5 N sulfuric acid at a flow rate of about 4 ml. per minute. Collect the acid eluate in fractions of 100 ml. each; approximately 30 to 35 fractions required to completely remove the antibiotics. Assay each fraction, using the standard agar diffusion technique against *S. aureus* ATCC 6538P (described heretofore). Pool the fractions of highest activity and adjust to pH 7.0 using IRA–401S resin in the hydroxyl cycle. Filter and concentrate the filtrate under reduced pressure to a small volume and lyophilize to obtain off-white powder of crude Antibiotic 15 complex (weighing approximately 13 to 15 gms.).

EXAMPLE 2

Perform steps A through F as in Example 1. Dissolve 1 gm. of crude Antibiotic No. 15 complex in 5.0 ml. of water and slowly absorb onto 50 gm. of Sephadex G–10 (Pharmacia Inc. New Market, N.J.) in a glass column 18" —5/8"). Pass distilled water through the column at the rate of about 0.3 ml. per minute. Collect approximately 65 to 85 fractions of 3.0 ml. each. Assay each fraction using the standard agar diffusion technique against *S. aureus*, ATCC 6538P (described heretofore). Concentrate each fraction to a residue under reduced pressure to determine the location of the salt residue. Combine the fractions of highest antibiotic activity and lowest salt contact by dissolving each fraction chosen in a small volume of water, pooling the solutions and lyophilizing the resultant pool to obtain an off-white powder (approximately 30–40 mg.) of de-salted Antibiotic No. 15 complex.

EXAMPLE 3

Perform the steps of Example 2.

Absorb 940 mg. of previously desalted Antibiotic 15 complex from an aqueous solution (2.0 ml.) on 5.0 g. of silicic acid. Vacuum dry the silicic acid-antibiotic at room temperature. Prepare a chromatographic column of 3 cm. x 42 cm. packed dry by gently tapping the side of the column while adding silicic acid to the top. The silicic acid containing the antibiotic complex is placed atop the dry column. Prepare a solvent mixture comprising ethanol-pyridine-acetic acid-water-ethylacetate in a ratio of 5:1:2:2:2 (v./v.). Pass the solvent mixture through the column at a flow rate of 1 ml. hour and collect the first 42 milliliters as individual fractions. Collect fractions every two hours thereafter. Test each fraction for antibacterial activity against *S. aureus* ATCC 6538P and *P. vulgaris*. Chromatograph each fraction on thin layer plates coated with silica gel G250μ in thickness. Employ the same solvent system used for the column and allow the plates 4–5 hours to develop. Dry plates in a stream of dry nitrogen or dry air and spray with starch-potassium iodide reagent. Pool the fractions of like activity and thin layer mobility. Concentrate the pooled fractions to a residue, re-dissolve the soluble portion of the residues in water and lyophilize to obtain the individual components of the Antibiotic No. 15 complex.

We claim:

1. A method for producing Antiobiotics 15 as defined in claim 3 which comprises cultivating the microorganism Streptomyces NRRL 3223 in an aqueous nutrient medium under submerged aerobic conditions until a composition of matter having substantial antibiotic activity is produced and separating said antibiotics therefrom.

2. The Antibiotic 15 complex when prepared by the process of claim 1 and having the following characteristics:
   (a) exhibits a positive color reaction in each of the ninhydrin and molisch tests,
   (b) exhibits no color reaction in each of the Sakaguchi and maltol tests,
   (c) possesses an antibacterial spectrum substantially as shown in Table VIII, and
   (d) exhibits substantial antibiotic activity after exposure to 100° C. and at a pH between 2.5 to 10.0 for 30 minutes.

3. A composition of matter selected from the group consisting of Antibiotic 15A, Antibiotic 15B, Antibiotic 15C, Antibiotic 15D, Antibiotic 15E and Antibiotic 15F;

Antibiotic 15A being an organic substance having the following elemental analyses: C=41.65%, H=7.23%, N=8.38% and O=42.74%,
having a specific optical rotation as measured by the D line of sodium at 25° C. of +56.0° in water at 0.19% concentration,
being transparent in the ultraviolet between 220 and 400 mμ,
being ninhydrin and starch-potassium iodide positive and Sakaguchi negative,
being stable in the presence of trypsin, chymotrypsin, pepsin and α-amylase for 3 hours at 37° C.,
having in infrared absorption as a thin film substantially as shown in FIGURE 1, with absorption bands as indicated in Table VII, and,
having an antibacterial spectrum including the bacteria enumerated in Table VIII;

Antibiotic 15B being an organic substance having the following elemental analyses: C=38.35%, H=6.45%, N=8.10% and O=47.10%,
being ninhydrin and starch-potassium iodide positive and Sakaguchi negative,
being transparent in the ultraviolet between 220 and 400 mμ,
being stable in the presence of trypsin, chymotrypsin, pepsin and α-amylase for 3 hours at 37° C.,
having an infrared absorption when suspended in solid form in hydrocarbon oil substantially as shown in FIGURE 2, with absorption bands as indicated in Table VII, and
having an antibacterial spectrum including the bacteria enumerated in Table VIII;

Antibiotic 15C being an organic substance having the lollowing elemental analyses: C=39.18%, H=6.81%, N=10.74% and O=43.27%,
having a specific optical rotation as measured by the D line of sodium at 25° C. of −1.3° in water at 0.26% concentration,
being transparent in the ultraviolet between 220 and 400 mμ,
being ninhydrin and starch-potassium iodide positive and Sakaguchi negative,
being stable in the presence of trypsin, chymotrypsin, pepsin and α-amylase for 3 hours at 37° C.,
having an infrared absorption spectrum as a thin film substantially as shown in FIGURE 3, with absorption bands as indicated in Table VII, and having an antibacterial spectrum including the bacteria enumerated in Table VIII;

Antibiotic 15D being an organic substance having the following elemental analyses: C=36.61%, H=6.42%, N=10.90% and O=46.37%, having a specific optical rotation as measured by the D line of sodium at 25° C. of +0.8° in water at 0.38% concentration, being transparent in the ultraviolet between 220 and 400 mμ, being ninhydrin and starch-potassium iodide positive and Sakaguchi negative, being stable in the presence of trypsin, chymotrypsin, pepsin and α-amylase for 3 hours at 37° C., having an infrared absorption spectrum substantially as shown in FIGURE 4, with absorption bands as indicated in Table VII, and, having an antibacterial spectrum including the bacteria enumerated in Table VIII;

Antibiotic 15E being an organic substance having the following elemental analyses: C=38.34%, H=6.85%, N=12.31% and O=42.49%, having a specific optical rotation as measured by the D line of sodium at 25° C. of +4.1° in water at a 0.39% concentration, being transparent in the ultraviolet between 220 and 400 mμ, being ninhydrin and starch-potassium iodide positive and Sakaguchi negative, being stable in the presence of trypsin, chymotrypsin, pepsin and α-amylase for 3 hours at 37° C., having an infrared absorption spectrum when suspended in a hydrocarbon oil substantially as shown in FIGURE 5, with absorption bands as indicated in Table VII, and, having an antibacterial spectrum including the bacteria enumerated in Table VIII;

Antibiotic 15F being an organic substance having the following elemental analyses: C=44.45%, H=7.61%, N=12.89% and O=35.05%, being transparent in the ultraviolet between 220 and 400 mμ, being ninhydrin and starch-potassium iodide positive and Sakaguchi negative, being stable in the presence of trypsin, chymotrypsin, pepsin, and α-amylase for 3 hours at 37° C., having an infrared absorption spectrum when suspended in hydrocarbon oil substantially as shown in FIGURE 6, with absorption bands as indicated in Table VII, and, having an antibacterial spectrum including the bacteria enumerated in Table VIII.

4. A composition of claim 3, said composition being Antibiotic 15A.

5. A composition of claim 3, said composition being Antibiotic 15B.

6. A composition of claim 3, said composition being Antibiotic 15C.

7. A composition of claim 3, said composition being Antibiotic 15D.

8. A composition of claim 3, said composition being Antibiotic 15E.

9. A composition of claim 3, said composition being Antibiotic 15F.

References Cited

UNITED STATES PATENTS 3,342,681    9/1967    Argoudelis et al.

ALBERT T. MEYERS, Primary Examiner

J. GOLDBERG, Assistant Examiner

U.S. Cl. X.R.

195—80